UNITED STATES PATENT OFFICE.

OSKAR UNGER, OF ELBERFELD, GERMANY, ASSIGNOR TO THE FARBEN-FABRIKEN OF ELBERFELD COMPANY, OF NEW YORK.

BLUE ANTHRAQUINONE DYE AND METHOD OF MAKING SAME.

SPECIFICATION forming part of Letters Patent No. 654,294, dated July 24, 1900.

Application filed January 2, 1900. Serial No. 155. (Specimens.)

*To all whom it may concern:*

Be it known that I, OSKAR UNGER, chemist, doctor of philosophy, residing at Elberfeld, Germany, (assignor to the FARBENFABRIKEN OF ELBERFELD COMPANY, of New York,) have invented a new and useful Improvement in the Manufacture of Blue Anthraquinone Dyes; and I do hereby declare the following to be an exact and clear description of my invention.

My new process consists in first causing halogens, such as bromine, to act on alphamonoamidoanthraquinone having the formula:

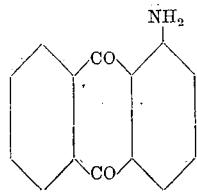

secondly, treating the new halogen derivatives thus obtained with aromatic amines—such as aniline, ortho or para toluidine, xylidine or the like—and finally transforming the so-produced condensation products into valuable dyestuff sulfonic acids by the action of sulfonating agents. The new coloring-matters thus obtained are in dry state, dark powders which are soluble with difficulty in water and soluble in ammonia with a blue color. They dye unmordanted and chrome-mordanted wool fast-blue shades.

In carrying out my new process practically I can proceed as follows, the parts being by weight: Ten parts of alphamonoamidoanthraquinone, which are spread out in a suitable vessel, are subjected to the action of bromine. When the product treated in this manner has assumed a uniform loam-yellow color, it is washed with water, then with a dilute sodium-carbonate solution, and finally dried. The brominated alphamonoamidoanthraquinone thus produced represents a garnet-red powder. When recrystallized from glacial acetic acid, it is obtained in the shape of brick-red needles. According to analytical researches it is an alphamonoamidoanthraquinone dibromide melting at 221° centigrade.

In order to produce the condensation product with paratoluidine, ten parts of alphamonoamidoanthraquinone dibromide are mixed with one hundred parts of paratoluidine. This mixture is boiled in a vessel provided with a reflux condenser until a test portion dissolves in chloroform with an intense-blue color. After the reaction mass has been allowed to cool it is mixed with twice its volume of alcohol, by means of which operation the new compound separates in the shape of dark-violet leaves. Subsequently the new body is filtered off and dried. The new compound thus obtained is soluble with an intense-blue color in aniline, pyridine, and chloroform, soluble with difficulty in glacial acetic acid, and scarcely soluble in ligroin. When recrystallized from glacial acetic acid, it is obtained in the shape of large dark-violet leaves. In order to transform this body into a dyestuff sulfonic acid ten parts of the finely-pulverized compound are stirred into a mixture prepared from twenty-five parts of fuming sulfuric acid (containing twenty per cent. of $SO_3$) and seventy-five parts of sulfuric monohydrate. The resulting blue solution is then heated at about from 50° to 70° centigrade until a test portion when poured into water and filtered off is clearly dissolved by hot water. Subsequently the reaction mass is poured into about one thousand parts of ice-water, and from the mixture thus produced the dyestuff is completely separated by the addition of common salt. It is filtered off and can be used for dyeing either in a pasty state or after previous drying.

When dry and pulverized, the new coloring-matter represents a violet powder which is difficultly soluble in water with a blue color. It is soluble in ammonia, difficultly soluble in alcohol with a blue color, and dissolves but slightly in hydrochloric acid with a yellowish-red color. By concentrated sulfuric acid (of 66° Baumé) it is dissolved, yielding a blue solution, the color of which changes into bluish red on the addition of a small quantity of ice, while on adding a larger quantity of ice the color of the solution changes into blue, a blue precipitate being separated therefrom.

The new coloring-matter dyes unmordanted and chrome-mordanted wool fast-blue shades.

Having now described my invention and in what manner the same is to be performed, what I claim as new, and desire to secure by Letters Patent, is—

1. The process for producing new anthraquinone dyestuffs which process consists in first treating alphamonoamidoanthraquinone having the formula

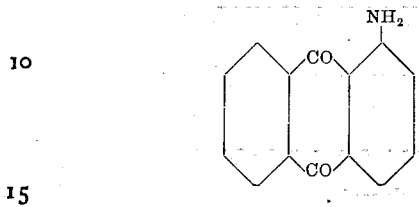

with halogens, secondly heating the halogen derivatives thus obtained with an aromatic amine, and finally transforming the condensation products thus obtained into dyestuff sulfonic acids by the action of sulfonating agents, substantially as hereinbefore described.

2. The process for producing a new anthraquinone dyestuff by first treating the alphamonoamidoanthraquinone with bromine, secondly heating the alphamonoamidoanthraquinone dibromide thus obtained with paratoluidine and finally transforming the resulting condensation product into a dyestuff sulfonic acid by the action of a mixture of sulfuric monohydrate and fuming sulfuric acid, substantially as hereinbefore described.

3. The herein-described new anthraquinone dyestuffs obtainable by sulfonating condensation products from the halogen derivatives of alphamonoamidoanthraquinone with aromatic amines, which dyestuffs, when dry and pulverized, are dark powders difficultly soluble in water with a blue color, and soluble in ammonia with a blue color, dyeing unmordanted and chrome-mordanted wool fast-blue shades, substantially as hereinbefore described.

4. The herein-described specific anthraquinone dyestuff obtainable by sulfonating the condensation product of alphamonoamidoanthraquinone dibromide with a paratoluidine, representing when dry and pulverized a dark powder dissolving with difficulty in water and alcohol, soluble in ammonia with a blue color and but slightly soluble in hydrochloric acid with a yellowish-red color, being dissolved by concentrated sulfuric acid (of 66° Baumé) yielding a blue solution the color of which changes into bluish red on the addition of a small quantity of ice while on adding a larger quantity of ice the solution turns blue a blue precipitate being separated therefrom, dyeing unmordanted and chrome-mordanted wool fast-blue shades, substantially as hereinbefore described.

In testimony whereof I have signed my name in the presence of two subscribing witnesses.

OSKAR UNGER.

Witnesses:
OTTO KÖNIG,
JET RITTERSHAUS.

It is hereby certified that in Letters Patent No. 654,294, granted July 24, 1900, upon the application of Oskar Unger, of Elberfeld, Germany, for an improvement in "Blue Anthraquinone Dyes and Methods of Making Same," an error appears in the printed specification requiring correction, as follows: In line 48, page 2, the article "a" should be stricken out; and that the said Letters Patent should be read with this correction therein that the same may conform to the record of the case in the Patent Office.

Signed, countersigned, and sealed this 7th day of August, A. D., 1900.

[SEAL.]
F. L. CAMPBELL,
*Assistant Secretary of the Interior.*

Countersigned:
WALTER H. CHAMBERLIN,
*Acting Commissioner of Patents.*